Patented Mar. 10, 1925.

1,529,314

UNITED STATES PATENT OFFICE.

KARL LAUSTER, OF ELIZABETH, NEW JERSEY.

WIRE-DRAWING LUBRICANT.

No Drawing.   Application filed May 3, 1924.   Serial No. 710,900.

*To all whom it may concern:*

Be it known that I, KARL LAUSTER, a citizen of the Republic of Germany, residing in the city of Elizabeth, county of Union, and State of New Jersey, have invented certain new and useful Improvements in Wire-Drawing Lubricants, of which the following is a specification.

This invention relates to wire drawing lubricants and has for its primary object to provide a new lubricant composition for facilitating the drawing operation and reducing wear upon the die to a minimum.

It is another object of the invention to provide a lubricant for the above purpose which will not readily become dry and hard and which will be uniformly homogeneous.

It is also another object of the invention to provide a lubricant composition, the several ingredients of which are inexpensive and which can be readily and quickly mixed to provide a plastic composition of the desired consistency.

With the above and other objects in view, the invention consists in the improved wire drawing lubricant embodying the several ingredients to be presently referred to, or the equivalent thereof.

In the preferred embodiment of the invention, a quantity of tallow is first melted to a fluid condition and to the melted tallow is added sulphuric acid, soap powder, talc powder, soda, green soap, rye flour and water. These several ingredients are thoroughly mixed by agitation and permitted to cool. In this manner there will be obtained a homogeneous plastic composition. This composition is more particularly intended for use in wet wire drawing operations, wherein the surfaces of the wire and the die are thoroughly wet. It has been found that this composition applied to the die and the wire greatly preserves the life of the former by the elimination of excessive wear and also obviates uneven wearing down of the wire as it is drawn through the die. It will be seen that the several ingredients of this lubricant composition are such as may be easily obtained at small expense.

While reference has been made to the fact that these ingredients are mixed together in certain proportion, it may be possible to use more or less of the individual ingredients with respect to the others within certain limits without appreciably affecting the final product.

The product is especially advantageous in the use of wire drawing, in that the roughing of the wire or the wire getting hard, does not take place, and secondly, the dies or the diamonds thereof are worn almost inappreciably, and thereby a considerable saving in diamonds is effected; and thirdly, the production is increased as the dies used need not be changed so often, nor the preparation of the machine so often required.

It has been found that when a rough or sharpened wire is taken, and dipped for a minute in the composition, and then the wire allowed to be exposed to the atmosphere for several hours to dry, and then is again dipped for a minute, and thereafter the wire is drawn, it will be round and smooth.

My composition is clean in its use, and leaves no layer of fat on the machines and on the clothes of the workers. It is soluble in hot or cold water, and may be immediately used and is applicable to all wire drawing machines for all metals.

A preferable proportion of the ingredients of the mixture is as follows: In one hundred parts: 30 lbs. of tallow, 10 lbs. of talc powder, 20 lbs. of rye flour, 6 lbs. of sulphuric acid, Baumé 5°, specific gravity 1.53; 5 lbs. of soda, 5 lbs. of green soap, 5 lbs. of soap powder, 19 lbs. of water.

I have described one embodiment of my invention to enable anyone skilled in the art to make and use the same, but changes may be made without departing from the spirit and scope of the invention as defined in the appended claims.

Having thus described my invention, what I claim as new and desire to secure by Letters Patent, is:—

1. A wire drawing lubricant composition consisting of tallow, sulphuric acid, talc powder, soap powder, soda, green soap, rye flour and water.

2. A wire drawing lubricant composition consisting of a mixture of 30 parts of tallow, 10 parts of talc powder, 20 parts rye flour, 6 parts sulphuric acid, 5 parts of soda, 5 parts of green soap, and 5 parts of soap powder, and 19 parts of water.

In testimony whereof I have signed my name to this specification.

KARL LAUSTER.